United States Patent
Takac et al.

(10) Patent No.: US 8,374,783 B2
(45) Date of Patent: Feb. 12, 2013

(54) SYSTEMS AND METHODS FOR IMPROVED POSITION DETERMINATION OF VEHICLES

(75) Inventors: Frank Takac, Balgach (CH); Oliver Zelzer, Feldkirch (AT); William James Kellar, Brisbane (AU)

(73) Assignee: Leica Geosystems AG, Heerbrugg (CH)

( * ) Notice: Subject to any disclaimer, the term of this patent is extended or adjusted under 35 U.S.C. 154(b) by 819 days.

(21) Appl. No.: 12/039,601

(22) Filed: Feb. 28, 2008

(65) Prior Publication Data

US 2009/0099774 A1 Apr. 16, 2009

Related U.S. Application Data (60) Provisional application No. 60/978,806, filed on Oct. 10, 2007.

(51) Int. Cl.
- G01C 21/00 (2006.01)
- G01C 21/30 (2006.01)
- G01C 21/10 (2006.01)
- G08G 1/123 (2006.01)

(52) U.S. Cl. ........ 701/466; 701/408; 701/472; 701/500; 701/501; 701/502; 701/503; 701/504; 701/505; 701/506; 701/507; 701/508; 701/509; 701/510; 701/511; 701/512; 701/519; 701/468; 701/469; 701/535; 340/988; 340/989; 340/990; 340/991; 340/992

(58) Field of Classification Search .................. 701/216, 701/466, 408, 472, 500–512, 519, 469, 535; 340/988–996
See application file for complete search history.

(56) References Cited

U.S. PATENT DOCUMENTS

| | | | |
|---|---|---|---|
| 6,088,653 A | 7/2000 | Sheikh et al. | |
| 6,101,430 A | 8/2000 | Fuller et al. | |
| 6,658,354 B2 | 12/2003 | Lin | |
| 6,754,584 B2 | 6/2004 | Pinto et al. | |
| 7,139,651 B2 * | 11/2006 | Knowlton et al. | 701/50 |
| 7,328,104 B2 | 2/2008 | Overstreet et al. | |
| 2002/0021245 A1 * | 2/2002 | Lin et al. | 342/357.14 |
| 2003/0112171 A1 * | 6/2003 | Michaelson et al. | 342/41 |
| 2008/0077284 A1 * | 3/2008 | Swope | 701/5 |
| 2009/0099774 A1 | 4/2009 | Takac et al. | |

OTHER PUBLICATIONS

DGPS/INS data fusion for land navigation, Berdjag et al. 7th International Conference on Information Fusion 2004, Jun. 28, 2004 to Jul. 1, 2004, Stockholm, Sweden; http://www.fusion2004.foi.se/papers/IF04-0881.pdf.
U.S. Appl. No. 12/039,542, Amendment filed Jul. 29, 2011.
U.S. Appl. No. 12/039,542, Restriction Requirement Response filed Jun. 30, 2011.
U.S. Appl. No. 12/039,542, Notice of Allowance mailed Sep. 20, 2011.
U.S. Appl. No. 12/039,542, Office Action mailed Jul. 21, 2011.
U.S. Appl. No. 12/039,542, Restriction Requirement mailed Jun. 9, 2011.

* cited by examiner

*Primary Examiner* — Thomas Tarcza
*Assistant Examiner* — Adam Tissot
(74) *Attorney, Agent, or Firm* — Maschoff Gilmore & Israelsen

(57) ABSTRACT

Systems and methods for determining a position of a vehicle are described. The system includes at least one GNSS sensor mounted to the vehicle for receiving GNSS signals of a global positioning system and at least one physical sensor mounted to the vehicle for generating physical data indicative of a physical parameter of at least a part of the vehicle. The system also includes a recursive statistical estimator, such as a Kalman Filter, in communication with the GNSS sensor(s) for seeding the recursive statistical estimator with an output of the GNSS sensor(s) to determine an estimated position of the vehicle. A data fusion module combines the estimated position and velocity of the vehicle with the physical data thus generating combined data, which is used to seed the recursive statistical estimator to determine an updated estimated position of the vehicle.

23 Claims, 12 Drawing Sheets

3D Position Error vs. Time

GDOP vs. Time

*Fig. 15* ures, such as position, attitude and velocity and/or the variation in such parameters. However, most sensors produce biased data with a dependency on several factors, e.g. time or temperature. Therefore, the biases in the sensor data need to be minimized to yield accurate position determinations.

Furthermore, various sensors are typically located in different positions on the vehicle and therefore the sensors are not located at the vehicle's centre of motion. Furthermore, even though the vehicle is a solid object, different parts of the vehicle accelerate differently, particularly when undergoing angular rotations.

It is well known to combine the GNSS data with the data from one or more vehicle-mounted physical sensors to provide improved position determination systems and methods. However, such solutions remain susceptible to degradation caused by poor satellite visibility.

SYSTEMS AND METHODS FOR IMPROVED POSITION DETERMINATION OF VEHICLES

CROSS-REFERENCE TO RELATED APPLICATIONS

This application claims the benefit of U.S. Provisional Patent Application Ser. No. 60/978,806, the contents of which are hereby incorporated by reference herein.

BACKGROUND

Many applications use methods and systems for position determination, e.g. of a geodetic instrument, a vehicle or the like, which are based on global positioning systems, such as, for example, GPS, GLONASS or the European Galileo system. These Global Navigation Satellite Systems (GNSS) are based on the reception of satellite signals.

The requirements of vehicle guidance or navigation, e.g. in agricultural, mining, trucking or railroad applications, have subtle differences to those of surveying, including a much stronger requirement for continuously available positioning. However, the ability to provide continuously available positioning is impaired when there is poor satellite "visibility" or one or more of the satellites are inoperative, which results in the accuracy of the position determination being degraded. For example, GPS systems require at least four satellites to be "visible" to enable a good position determination.

In many applications Kalman Filters are used to generate an estimate of a trajectory and to allow vehicle guidance in real-time. A Kalman Filter is a recursive estimator that relies on an estimated state from a previous step and current measured data to calculate an estimate for a current state. One example of a system based on a Kalman Filter is Leica Geosystems' Core Algorithm Library (CAL) technology. The CAL system uses GNSS reference station data and rover observation data for the current measured data to calculate an estimate for the current vehicle position. However, this system is also susceptible to degradation due to the aforementioned poor satellite visibility or satellite downtime.

Other position determination and navigation systems use sensor data, e.g. from one or more physical sensors, such as magnetometers, acceleration sensors or angular rate sensors, mounted to the vehicle, in order to derive further information about the vehicle's parame

BRIEF SUMMARY OF SEVERAL EXAMPLE EMBODIMENTS

According to one aspect, but not necessarily the broadest aspect, embodiments of the invention reside in a system for determining a position of a vehicle comprising: a) at least one GNSS sensor mounted to the vehicle for receiving GNSS signals of a global positioning system; b) at least one physical sensor mounted to the vehicle for generating physical data indicative of at least one physical parameter of at least a part of the vehicle; c) a recursive statistical estimator coupled to be in communication with the at least one GNSS sensor for seeding the recursive statistical estimator with an output of the at least one GNSS sensor to determine an estimated position and velocity of the vehicle; and d) a data fusion module for combining the estimated position and velocity of the vehicle with the physical data thus generating combined data; wherein the recursive statistical estimator is seeded with the combined data to determine an updated estimated position of the vehicle.

According to another aspect, but again not necessarily the broadest aspect, embodiments of the invention reside in a method for determining a position of a vehicle including: a) receiving GNSS signals of a global positioning system with at least one GNSS sensor; b) generating physical data indicative of at least one measured physical parameter of at least a part of the vehicle with at least one physical sensor; c) seeding a recursive statistical estimator with an output of the at least one GNSS sensor to determine an estimated position and velocity of the vehicle; d) combining the estimated position and velocity of the vehicle with the physical data to generate combined data; and e) seeding the recursive statistical estimator with the combined data to determine an updated estimated position of the vehicle.

Further features of the present invention will become apparent from the following detailed description.

These and other aspects of the present invention will become more fully apparent from the following description and appended claims.

BRIEF DESCRIPTION OF THE DRAWINGS

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SEVERAL EMBODIMENTS

The preferred embodiment relates generally to systems and methods for providing an improved position determination of vehicles, such as, but not limited to, agricultural and mining vehicles.

In this specification, the terms "comprises," "comprising," "includes", "including" or any other variation thereof, are intended to cover a non-exclusive inclusion, such that a method, process, article or apparatus that comprises a list of elements does not include only those elements, but may include other elements not expressly listed or inherent to such method, process, article or apparatus. An element preceded by, for example, "comprises a . . . " does not, without more constraints, preclude the existence of additional identical elements in the method, process, article or apparatus that comprises the element.

Figure 1:
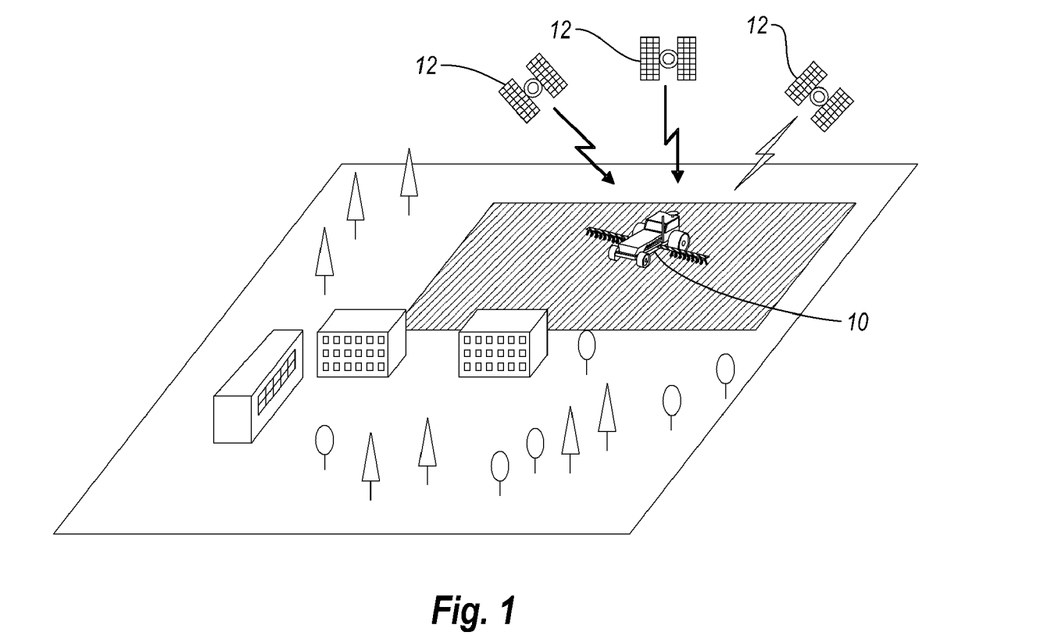
FIG. 1 is a schematic view showing the navigation of a vehicle using a satellite based positioning system in an agricultural context.

FIG. 1 shows an example of navigating a vehicle 10 that is used for cultivation of soil on farmland and that uses a satellite-supported positioning system. The aim is to determine the position of at least one point on the vehicle 10 with this system. The actual position can be derived from the signals of the satellites 12 from which signals are received by a receiver (shown in FIG. 2) on the vehicle 10.

Figure 2:
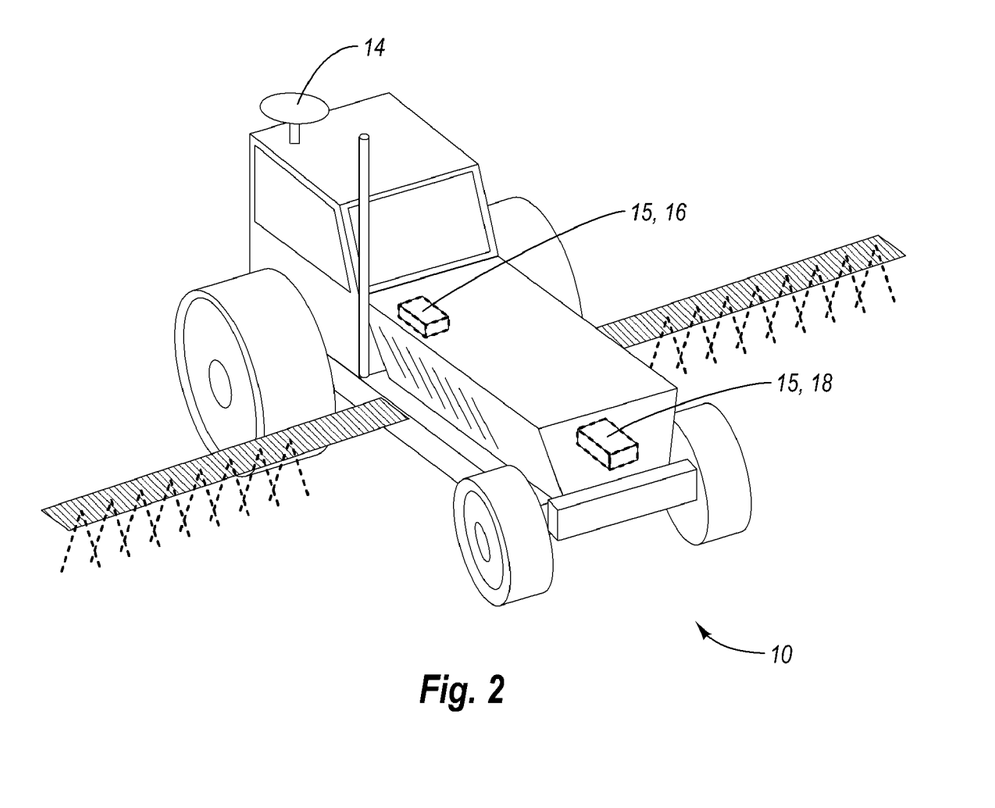
FIG. 2 is a schematic view of a vehicle with a GNSS sensor and physical sensors for agricultural applications.

FIG. 2 shows an example of the vehicle 10, which in this example is used for spraying crops on farmland. A Global Navigation Satellite System (GNSS) receiver or sensor 14 is mounted on top of the vehicle 10 for receiving GNSS-signals of the global positioning system. At least one physical sensor 15 for generating physical data indicative of at least one physical parameter of at least a part of the vehicle is mounted on or to the vehicle 10. According to some embodiments, the physical sensors 15 can be integrated within the structure of the vehicle 10 and/or mounted to an internal or external surface of the vehicle 10. In this specific example, the vehicle 10 comprises physical sensors 15 in the form of a magnetometer 16 and an angular rate sensor 18. However, other types of sensors, e.g. inertial sensors, may be used as alternative or supplementary sensors to the magnetometer 16 and the angular rate sensor 18 as described hereinafter.

Figure 3:
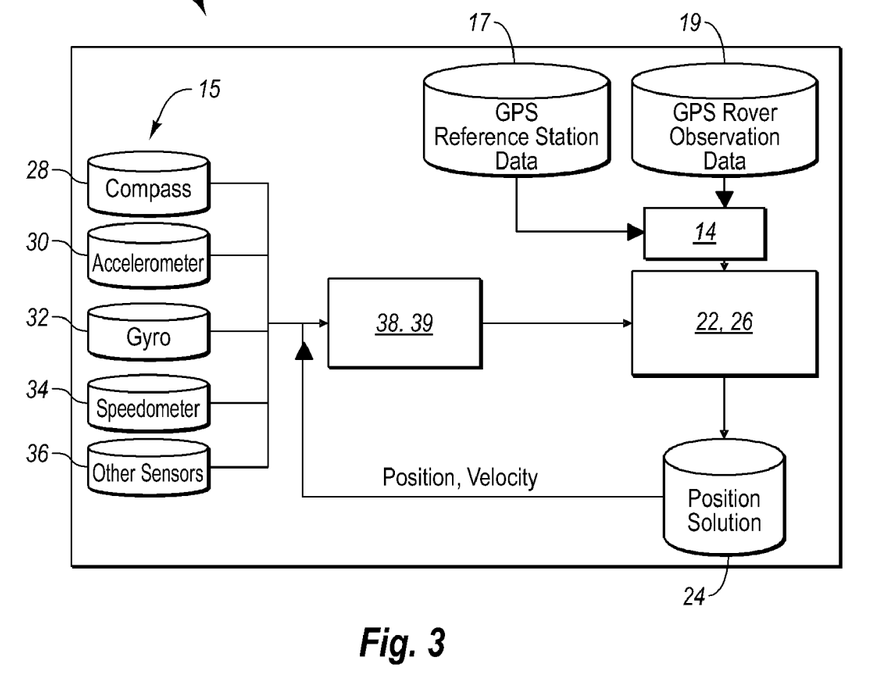
FIG. 3 is a schematic diagram of a system for determining a position of a vehicle in accordance with embodiments of the present invention.

In accordance with embodiments of the present invention, FIG. 3 shows a schematic representation of a system 20 for determining a position of the vehicle 10. System 20 comprises at least one GNSS-sensor 14 for receiving GNSS reference station data 17 and GNSS rover observation data 19. The one or more GNSS-sensors 14 are coupled to be in communication with an algorithm library 22, which stores algorithms necessary for processing the GNSS reference station data 17 and GNSS rover observation data 19 to determine an estimate of the position and velocity of the vehicle 10. Although FIG. 3 shows the GNSS-sensor 14 separately from the algorithm library 22, often they will be integrated into a single unit.

According to preferred embodiments, the algorithm library 22 is a modified version of Leica Geosystems'Core Algorithm Library (CAL) and comprises a recursive statistical estimator 26 for estimating the current position of the vehicle 10 based on a previous estimate and current measured data. In some embodiments, the recursive statistical estimator 26 is in the form of a Kalman Filter. However, in alternative embodiments, the recursive statistical estimator 26 can be in the form of an extended filter, a complementary filter, or an adaptive filter.

System 20 also comprises one or more physical sensors 15 for generating physical data indicative of one or more physical parameters of at least a part of the vehicle 10. In the embodiment shown in FIG. 3, the physical sensors 15 include a compass 28, an accelerometer 30, a gyroscope 32, a speedometer 34 and other sensors 36, which can include, but are not limited to, a magnetometer, an inclinometer and optical sensors, such as a camera or the like. Hence, the physical parameters that can be measured by the physical sensors 15 include the following: position, attitude, heading, inclination, speed, acceleration, rate of angular rotation, magnetic field strength.

The recursive statistical estimator 26 of the algorithm library 22 is seeded with an output of the GNSS sensor 14 to determine an initial estimate of the position and velocity, or a position solution 24, of the vehicle 10. The position and velocity estimates from the position solution 24 are combined in a data fusion module 38 with physical data from one or more of the physical sensors 15 and input to the recursive statistical estimator 26. The recursive statistical estimator 26 is seeded with the output from the data fusion module 38 to calculate an updated current position estimate.

Hence, the output of the recursive statistical estimator 26 is combined by the data fusion module 38 with physical data derived from the physical sensors 15 and input to the algorithm library 22. The algorithm library 22 comprises software required to process the GNSS data received by the GNSS sensor(s) 14. The algorithm library 22 supplements the GNSS data with the combined data from the data fusion module 38 to provide improved a priori position estimates. The algorithm library 22, and in particular the recursive statistical estimator 26, can therefore provide improved position estimates especially during periods of poor satellite visibility.

The data fusion module 38 of the system 20, which also comprises a recursive statistical estimator 39, uses a dynamic model describing time-dependent effects on the physical sensors 15. The dynamic model is based on an understanding of particular constraints on the vehicle 10 and the surface it travels on, coupled with an understanding of advantages and limitations of sensors being employed. The dynamic model allows an elimination of sensor bias, e.g. by analyzing a temporal series of data generated during movement of the vehicle 10. For example, for the magnetometer 16, this can be based on calculation of differences between GNSS-signal headings and physical data headings. For the angular rate sensor 18, the bias elimination is based on a best fit of a sequence of GNSS-data with a measured sequence of angular rates. These and other bias elimination steps can be integrated using an auxiliary algorithm performed before the recursive statistical estimator 39 as pre-processing or after the estimator 39 as post-processing. In other embodiments, bias elimination could be performed in the recursive statistical estimator 39.

External auxiliary algorithms lend themselves to an easier implementation of checks and corrections to the bias estimates of the physical sensors 15. Elimination of angular rate sensor (gyro 32) bias, for example, is particularly suited to being performed with pre-processing. Elimination of magnetometer biases can be done effectively either through pre-processing or post-processing and the choice may ultimately depend on wider architectural decisions within the overall software design.

The simplest way to eliminate yaw rate bias is to recognize that when the vehicle is not moving, its actual yaw-rate is zero. As such the average reported sensor yaw rate during a period of time when the vehicle is stationary is a useful estimate of the yaw-rate bias.

This shifts the problem to determining when the vehicle is stationary, which can be determined in a number of different ways. In some embodiments, the driver of the vehicle 10 can, via a man-machine interface (MMI), instruct an algorithm that the vehicle 10 is reliably still for a defined period. In other embodiments, the vehicle speed and gear could be monitored by sensors and when they indicate no movement, bias elimination can automatically proceed. Alternatively, since vehicle movement involves a significant increase in vehicle vibration and rate of change of twisting about its axes, one or more accelerometers 30 and rate gyros 32 can be monitored for stability and when a predetermined criteria is met that provides high confidence that there is no movement, bias elimination can automatically proceed. As a further alternative, GNSS measurements can be monitored to determine a lack of movement.

It is also useful to be able to continue to eliminate the bias when moving as the sensor bias may shift, particularly if the temperature changes. In this case a general algorithm can determine a yaw-rate sensor bias adjustment that achieves a best fit of a sequence of sequence of yaw rate estimates derived from the GNSS based velocity with the yaw rates reported from the other sensors.

Embodiments of the invention eliminate the magnetometer bias, for example due to magnetic anomalies and other sources, through various means, including by comparison with a reported GPS heading. When a reported GPS heading is available it is possible to take a series of samples of the difference between GNSS heading and magnetometer heading and average them to estimate magnetometer bias. More generally an algorithm can determine magnetometer bias adjustment that achieves a best fit of a sequence of magnetometer heading estimates derived from the GNSS points with the reported magnetometer headings.

In a GNSS-navigation algorithm—like Leica Geosystems' CAL technology—a first instance calibrates the sensors and the model over the long term, whereas a second instance exploits the model and the measurements to produce a form of tightly coupled solution. A typical Kalman Filter in the CAL technology has two modes of operation relevant to the inclusion of the dynamic model, as now described.

In a first mode, the algorithm assumes very little about the antenna position at each position update and thus freshly solves for the position each time. This suits Real-Time-Kinematics (RTK) surveying where the surveyor could move in any direction at any moment. This fresh solution may rely on ambiguities that were fixed at an earlier time if the GPS measurements support ambiguity fixing.

In a second mode, the algorithm exploits knowledge of antenna dynamics. Embodiments of the present invention in effect enable some of the same advantages in positioning that are available when an antenna is static to be obtained when the antenna is moving. The basis for the advantage in the static case is knowledge of antenna dynamics, which are trivially zero. For the dynamic antenna case, the additional physical sensors 15 provide knowledge of antenna dynamics, which are non-zero, and the principle exploited in the static mode is thus extended to dynamic modes.

The tightly coupled solution in effect allows use of the second mode while the vehicle is moving. This second mode delivers a series of advantages, including more rapid convergence of float solutions, smaller error estimates, (i.e. greater accuracy) for certain types of positioning, potentially maintaining integers during a brief period of weakness in the GPS measurements when GPS measurements support ambiguity fixing, which would otherwise result in the loss of integers, and improved ability to detect and reject cycle slips that are expected to happen when using some receivers in L1 only positioning.

The data fusion strategy aims to produce a "virtual" sensor that combines the best attributes of the physical sensors 15 while eliminating the weaknesses thereof. A particular example is data fusion for the magnetometer 16 and angular rate sensors 18, which produces vehicle heading and rate of change of vehicle heading. Nevertheless, the approach is not restricted to those specific sensors.

Figure 4:
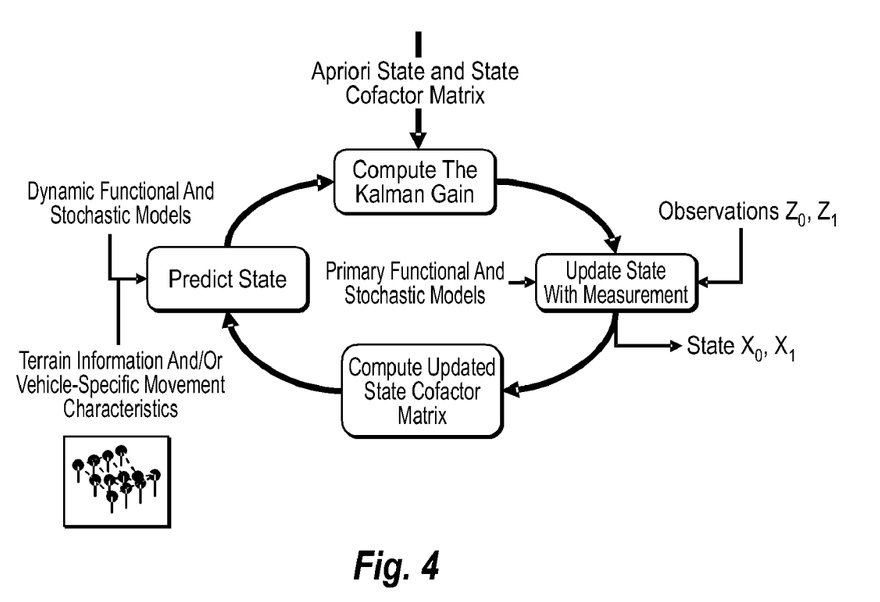
FIG. 4 is a schematic view showing the operation of a recursive statistical estimator in accordance with embodiments of the present invention.

According to some embodiments, the recursive statistical estimator 26 of the algorithm library 22 is in the form of a Kalman Filter and its operation is schematically represented in FIG. 4. FIG. 4 shows the entry point of the output from the data fusion module 38.

Although the operation of a Kalman Filter will be familiar to skilled addressees, a brief summary of the Kalman Filter will now be described in the context of the present invention for completeness and to ensure comprehension of the present invention.

According to some embodiments of the present invention, the Kalman Filter 26 of the algorithm library 22 includes a dynamic model, a measurement model and an estimate of initial conditions. The Kalman Filter 26 then executes the following steps: Error Covariance Extrapolation; Kalman Gain Calculation; Error Covariance Update; State Estimate Extrapolation, i.e. "apriori" applying a state transition matrix; and State Estimate Observational Update, i.e. "aposteriori" using measurements.

The dynamic model describing the orientation of the vehicle 10 and its motion can be represented as:

$$x_k = \Phi x_{k-1} + w_k \quad (1)$$

where the system state $x_k$ progresses over time from the previous state $x_{k-1}$ by applying the state transition matrix $\Phi$ allowing for some process noise $w_k$.

The measurement model is represented as:

$$z_k = H x_k + v_k \quad (2)$$

where measurements $z_k$ are represented as a linear combination H of some unknown underlying system state variables in $x_k$ allowing for some noise $v_k$ in the measurements.

The initial state estimate is fairly arbitrary and therefore a large initial error is assumed. It is also assumable that the initial heading is zero radians and the initial yaw-rate is zero radians per second.

Distinctions between representations of the true state and estimates of the state are made as follows. The dynamic model refers to a state vector Error! Objects cannot be created from editing field codes. which describes the true state of the system. Error! Objects cannot be created from editing field codes. indicates the estimated state of the system. Additionally, the concepts of a state prior to measurement (a priori) and a state after measurement (a posteriori) are used. The a priori state is signified with a superscript (−) and the a posteriori state is signified with a superscript (+).

The initial state estimate is considered to be a pseudo-measurement and a level of confidence is assigned to each estimate. The P matrix can be represented as:

$$P_0^{(+)} = \begin{bmatrix} \pi^2 & 0 \\ 0 & 1 \end{bmatrix} \quad (3)$$

since it can be considered that there is initially complete uncertainty in the heading, which means its value can range from $-\pi$ to $+\pi$. The expected error is $\pi$ and so the covariance is equal to $\pi^2$. On the basis of a large, relatively slow moving ground vehicle assuming a maximum yaw-rate of around 1 radian per second leads to a covariance of 1.

According to specific embodiments, the Kalman Filter required for two state data fusion is defined by determining values for Error! Objects cannot be created from editing field codes. and Error! Objects cannot be created from editing field codes., where Error! Objects cannot be created from editing field codes. is the covariance matrix for the process noise $w_k$, Error! Objects cannot be created from editing field codes. is the covariance matrix for the measurement noise $v_k$ and Error! Objects cannot be created from editing field codes. is the estimated initial state of the system. With reference to FIG. 4, the Kalman Filter 26 is executed starting with k=1 and iteratively applying the equations in the following steps:

Step 1: Error Covariance Extrapolation: Error! Objects cannot be created from editing field codes. (4)
Step 2: Kalman Gain Calculation: Error! Objects cannot be created from editing field codes. (5)
Step 3: Error Covariance Update: Error! Objects cannot be created from editing field codes. (6)
Step 4: Take new measurements to populate Error! Objects cannot be created from editing field codes.
Step 5: State Estimate Extrapolation: Error! Objects cannot be created from editing field codes. (7)
Step 6: State Estimate Observational Update: Error! Objects cannot be created from editing field codes. (8)
Step 7: Error! Objects cannot be created from editing field codes.
Step 8: Repeat step 1 and continue.

In the above equations, T indicates a matrix transpose operation, K is the Kalman Gain and I is the identity matrix.

Experimental results of embodiments of the present invention will now be discussed with reference to the results shown in FIGS. 5-13. The output of the data fusion module 38 to the algorithm library 22 according to one embodiment is as shown in Table 1:

TABLE 1

| Quantity | Units |
| --- | --- |
| Latitude | degrees |
| Longitude | degrees |
| Altitude | meters above ellipsoid |
| Velocity North | meters/second |
| Velocity East | meters/second |
| Velocity Up | meters/second |
| $\sigma_{lat}$ | meters |
| $\sigma_{lon}$ | meters |
| $\sigma_{alt}$ | meters |
| $\sigma_{vn}$ | meters/second |
| $\sigma_{ve}$ | meters/second |
| $\sigma_{vu}$ | meters/second |

Alternatively, the position may be expressed in Earth Centered, Earth Fixed (ECEF) coordinates, or another coordinate system.

A program selects the set of satellites that are not removed by iteratively searching for the set of satellites that provide the highest Geometric Dilution of Precision (GDOP) value. The number of satellites used in this GDOP calculation can be set to four, five, or six satellites. This search is performed only at the first epoch of the masking period in order to minimize geometry changes due to rising or setting satellites.

Figure 5:
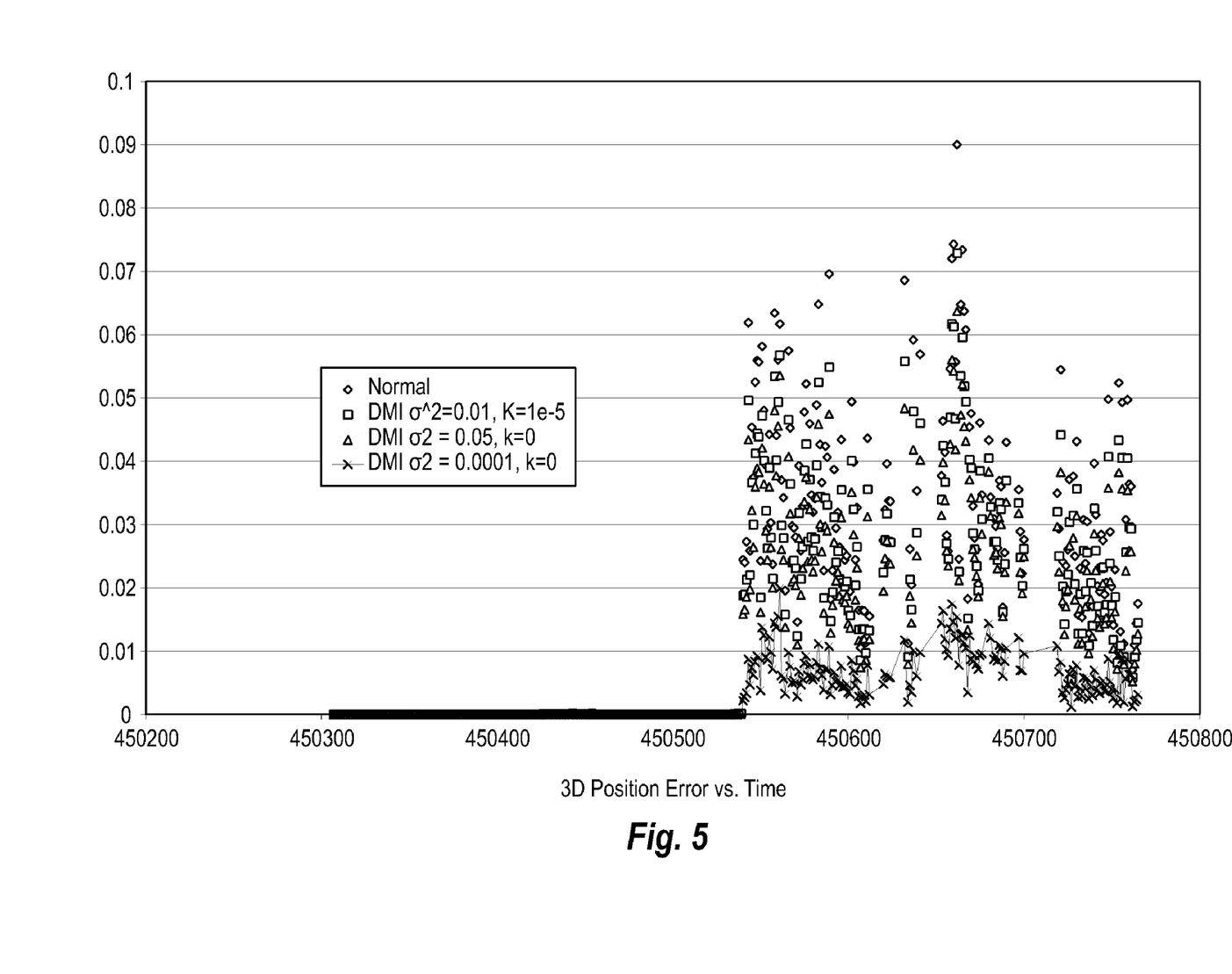
FIG. 5 shows the variation of 3D position error with time where five satellites are visible.
Figure 6:
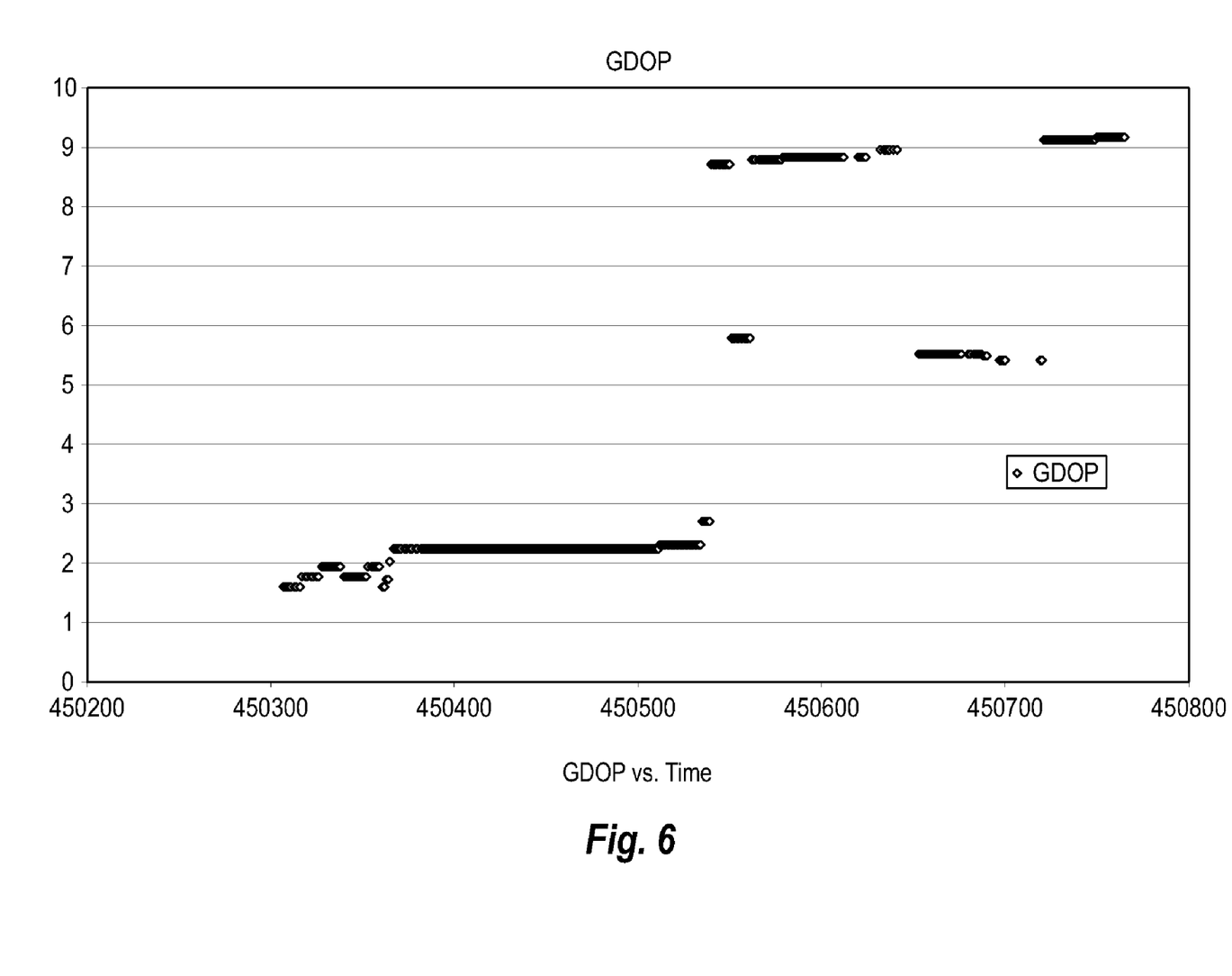
FIG. 6 shows the variation of Geometric Dilution of Precision (GDOP) with time where five satellites are visible.

For the scenario where at least five satellites 12 are available with a high GDOP and where the integers remain fixed, FIG. 5 shows the variation of 3D position error with time for different values of coordinate uncertainty $\sigma^2$ and FIG. 6 shows the variation of GDOP with time.

Figure 7:
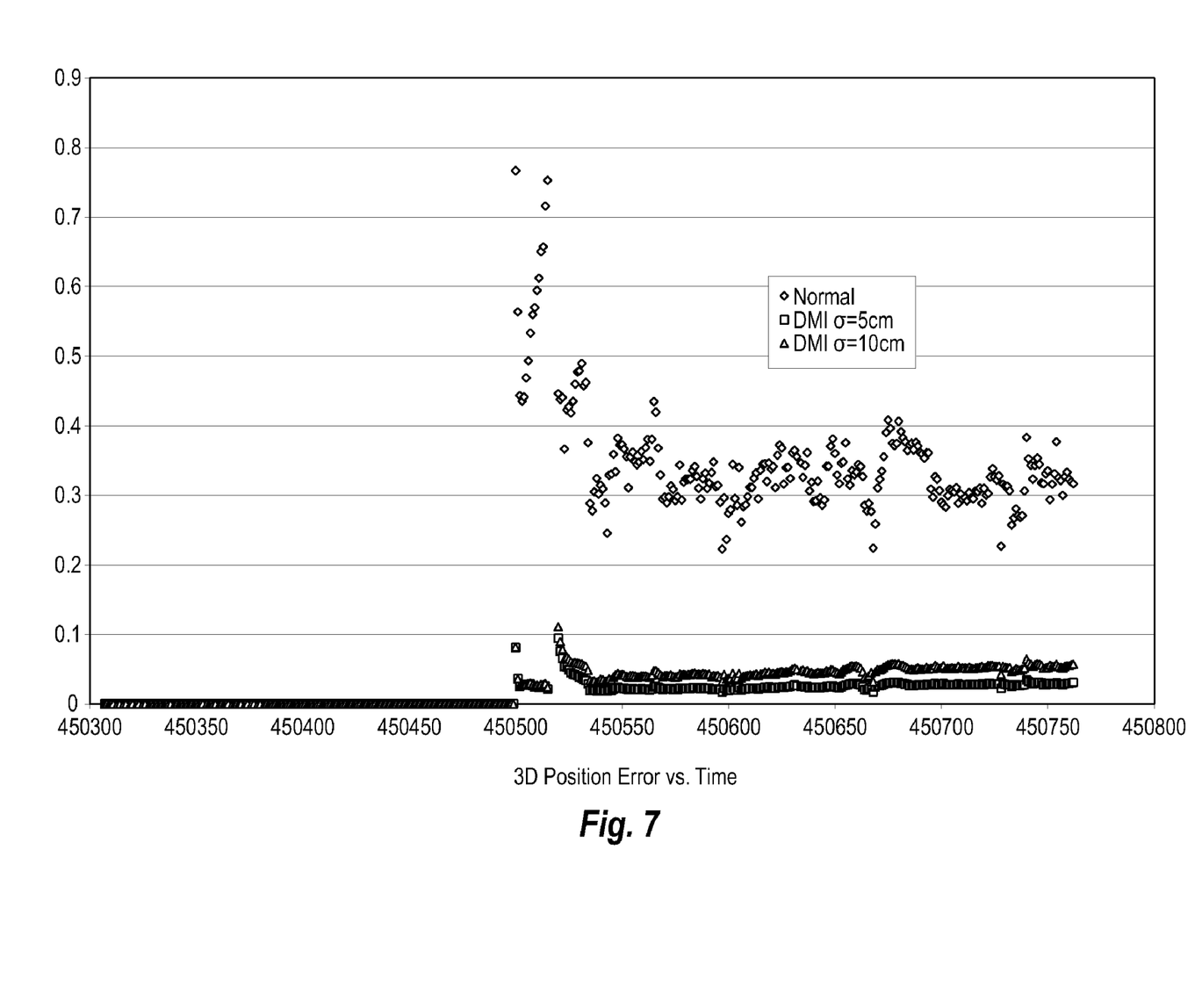
FIGS. 7-10 alternately show the variation of 3D position error with time and the variation of Geometric Dilution of Precision (GDOP) with time for different scenarios.
Figure 8:
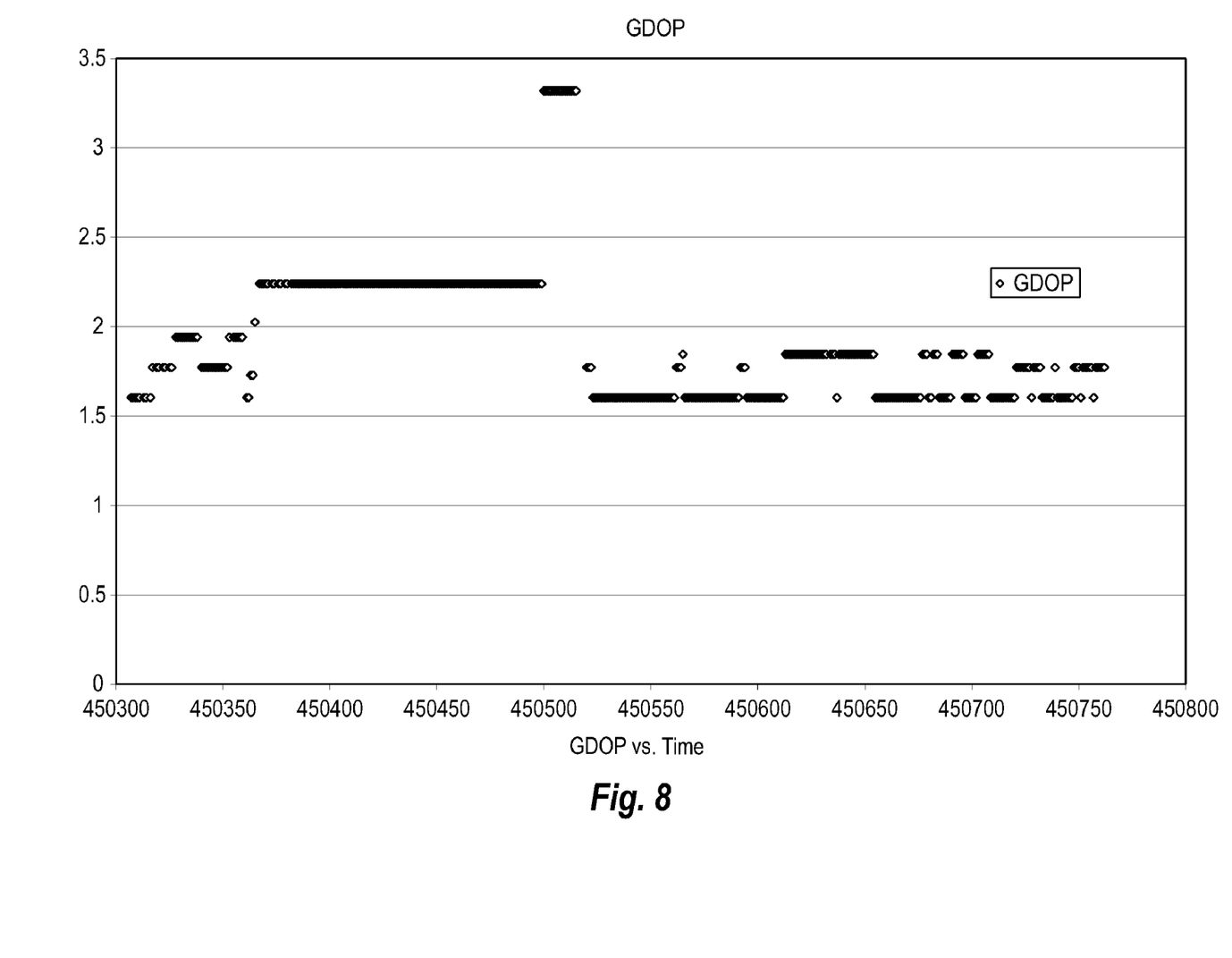

FIG. 7 shows the variation of 3D position error with time and FIG. 8 shows the variation of GDOP with time for the scenario in which the number of satellites is reduced to four after t=450500 s for a period of 20 s before the full satellite set is restored, hence a low satellite count and moderate GDOP. Integers are lost and not resolved during the remainder of the data set.

Figure 9:
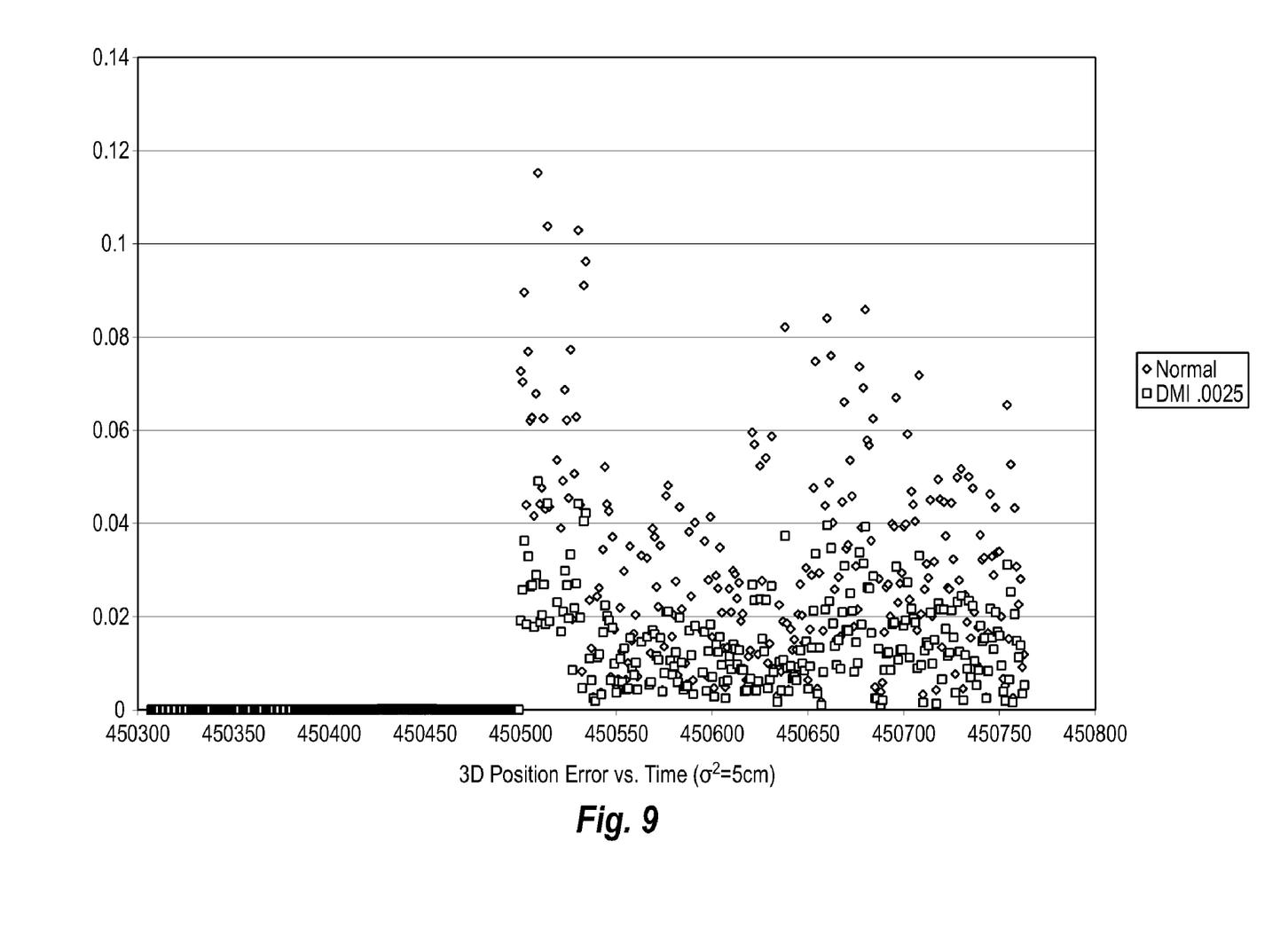
Figure 10:
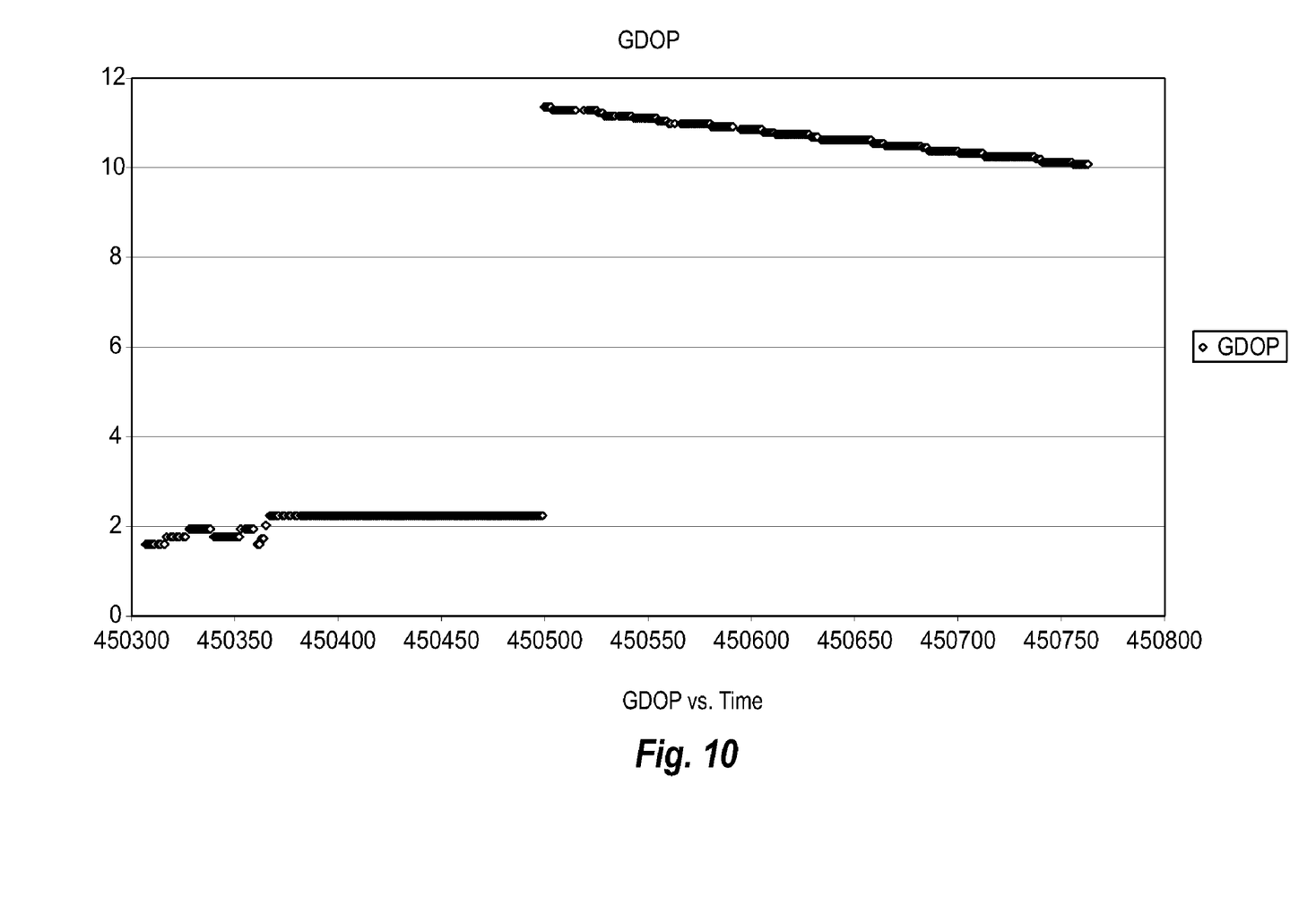

The variation of 3D position error with time shown in FIG. 9 and the variation of GDOP with time shown in FIG. 10 are for the scenario with a very high GDOP, coordinate uncertainty $\sigma^2=0.0025$ and where the integers remain fixed.

Figure 11:
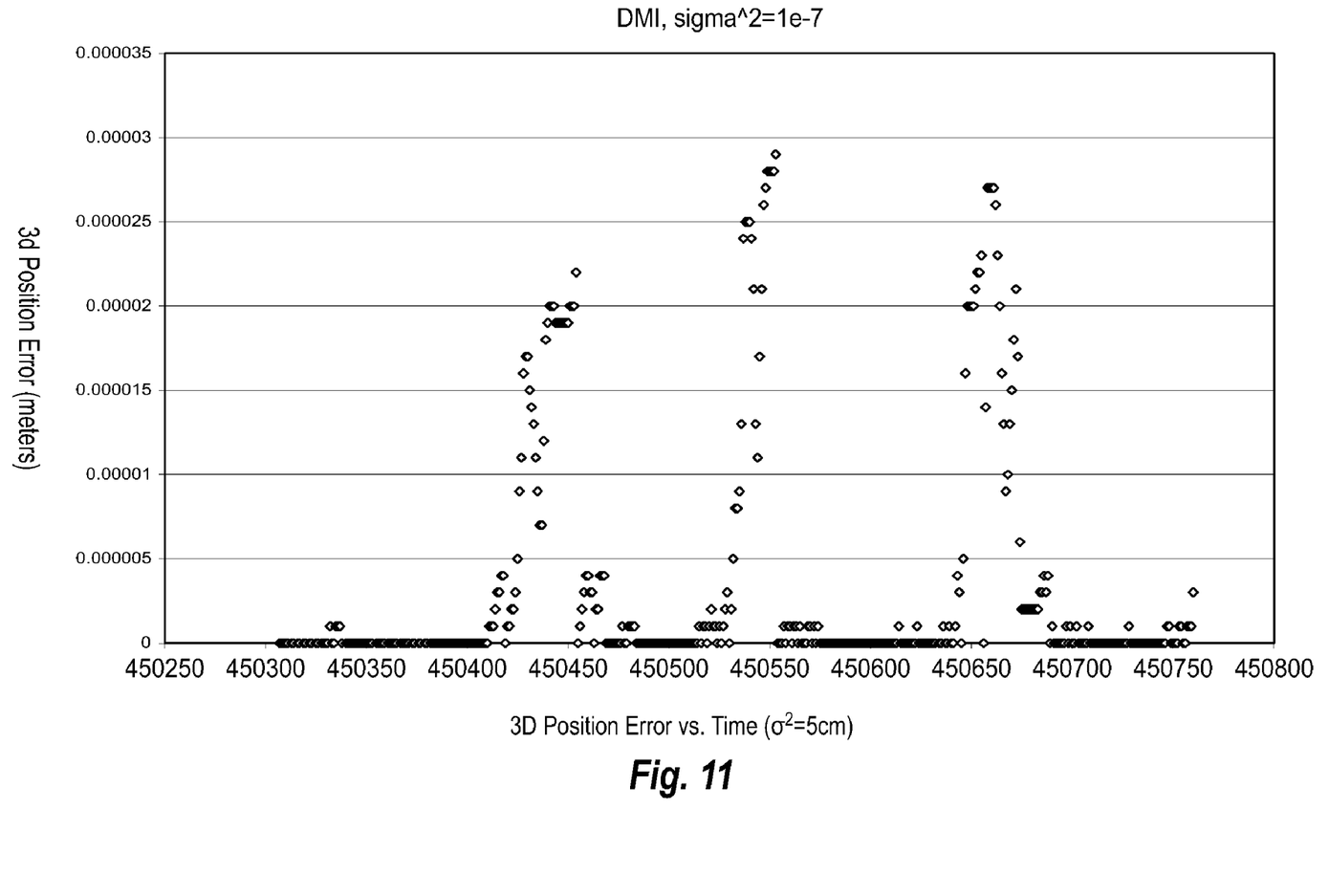
FIG. 11 shows the variation of 3D position error with time where a full satellite set is available.

With a full satellite set and the dynamic model input enabled with a small sigma, $\sigma^2=1\times10^{-7}$, the variation of 3D position error with time shown in FIG. 11 shows that the small sigma dynamic model input does not degrade the performance of the algorithm library outside the bounds expected from rounding errors in the input data.

Figure 12:
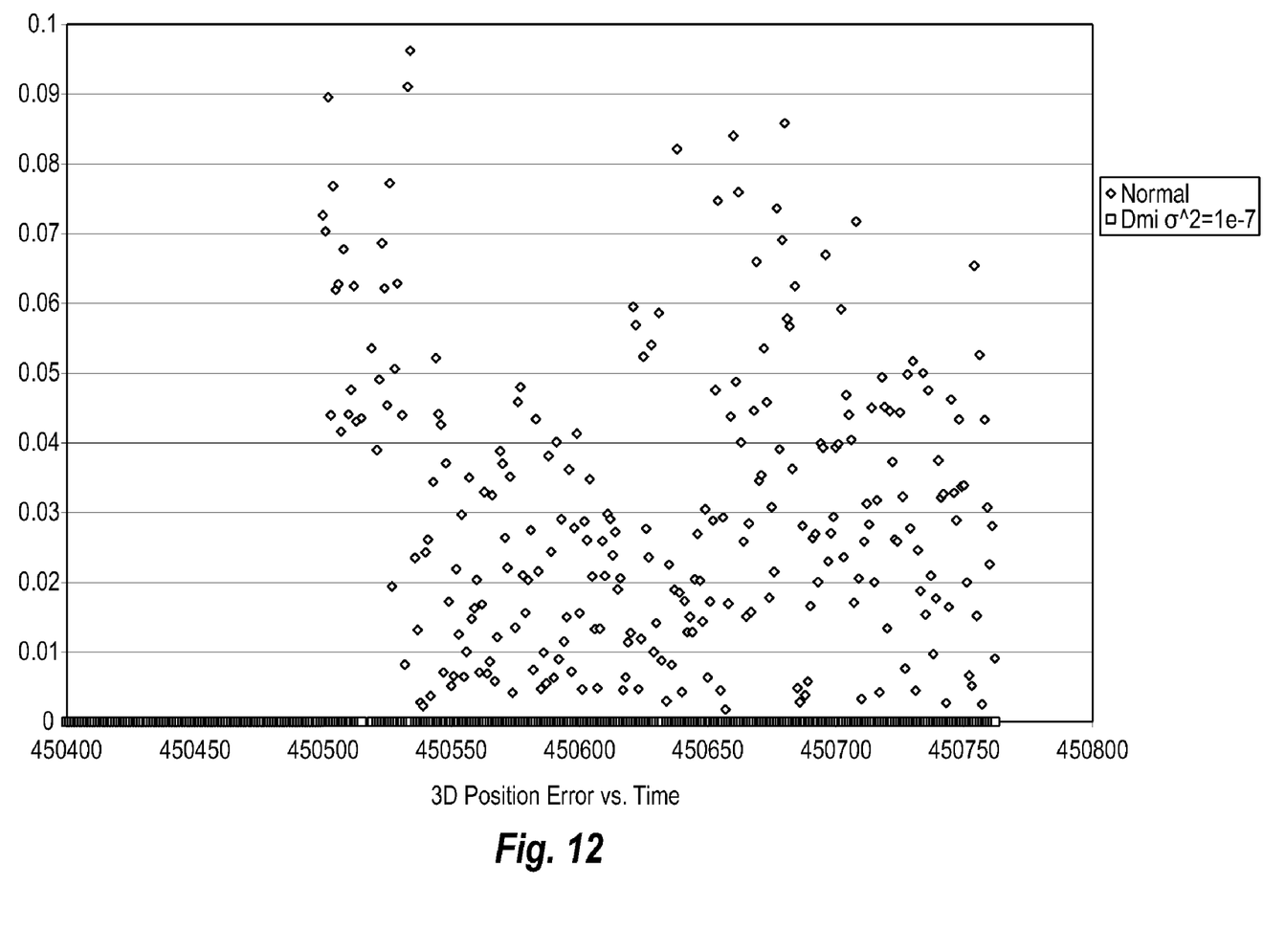
FIG. 12 shows the variation of 3D position error with time for a masked satellite set.
Figure 13:
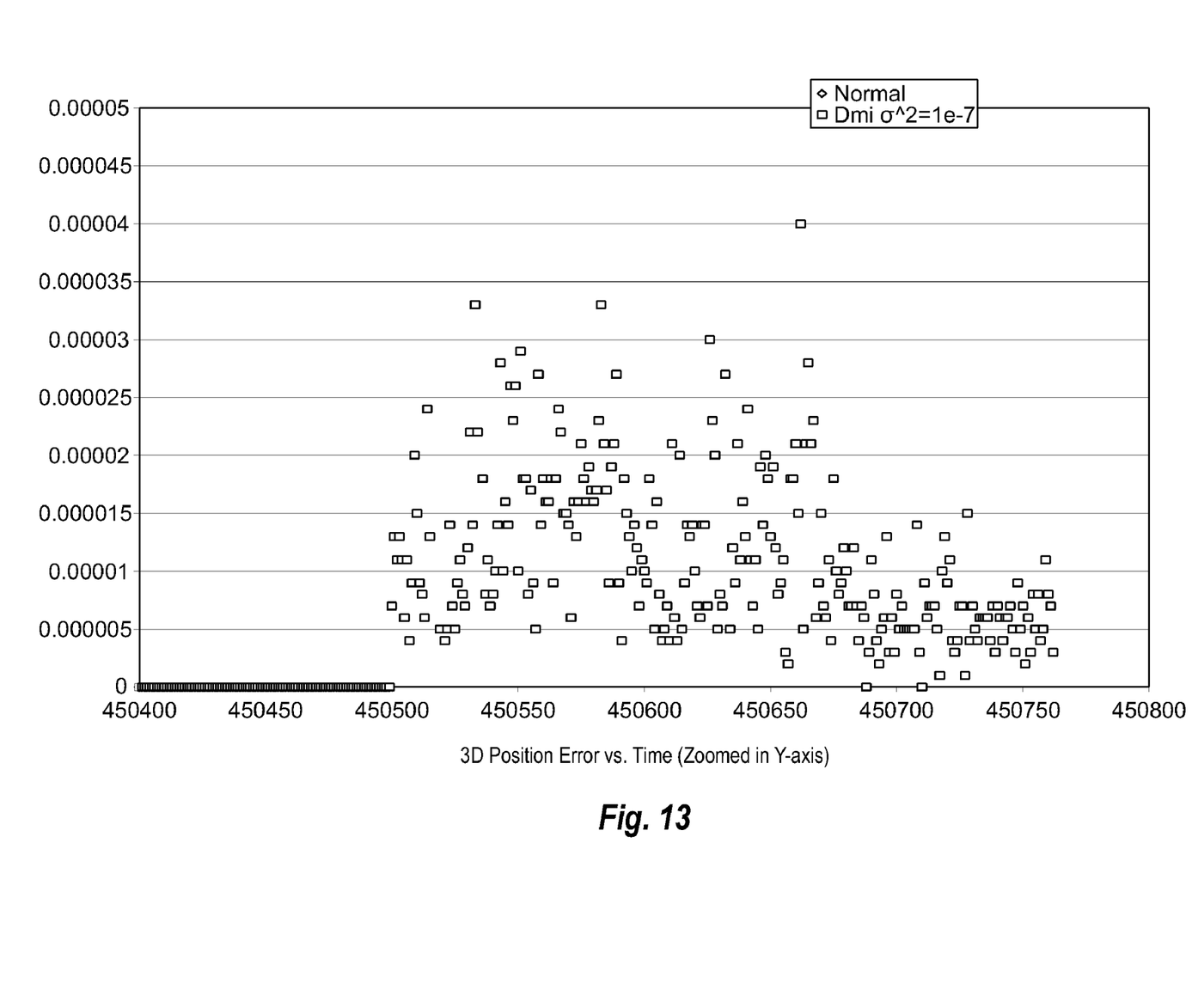
FIG. 13 shows the graph of FIG. 12 with an enlarged Y-axis to show the much smaller 3D position errors achieved with embodiments of the present invention.

The variation of 3D position error with time shown in FIGS. 12 and 13 is for the scenario comprising a masked satellite set, very high GDOP and very high confidence (very low sigma values) in the dynamic model input. $\sigma^2=1\times10^{-7}$ and it can be seen that the dynamic model input errors are slightly noisier than in the full satellite set shown in FIG. 11. FIG. 13 shows the data of FIG. 12 with an enlarged Y-axis for the 3D position error.

In many applications the movement of a vehicle is restricted by its typical characteristics, e.g. due to the technical conditions. One example is a moving track-bound system such as a railroad. Because of technical and/or safety reasons, the curvature of tracks and the speed of a wagon running on the tracks are limited. Therefore, the data generated by physical sensors 15 or GNSS sensors 14 are also limited in their range of values, e.g. for angular rates or estimated trajectory. Processing in embodiments of the present invention uses this information on vehicle-specific movement characteristics, e.g. in order to define a restriction for values of the physical sensors 15 or potential GNSS based positions. Hence, knowledge of typical vehicle specific characteristics allows restrictions for measurement or GNSS positional data or their processing to be defined, thus improving processing times and/or accuracy.

A further improvement is the integration of three-dimensional environmental information in the recursive statistical estimator 26. In the automotive industry for example, vehicle guidance or navigation systems are well known that use maps as a reduced and application specific two-dimensional representation of a surface or structural features. In many applications, such as mining or agriculture, three-dimensional models are already used or at least available, e.g. digital terrain models (DTM). Information based on such models, e.g. slope of the terrain or rocks, swamps or other prohibited zones indicated in the model, can also be used to improve the recursive statistical estimator 26, e.g. to calculate the Kalman Gain where the estimator 26 is a Kalman Filter, thereby further restricting an estimated trajectory.

Figure 14:
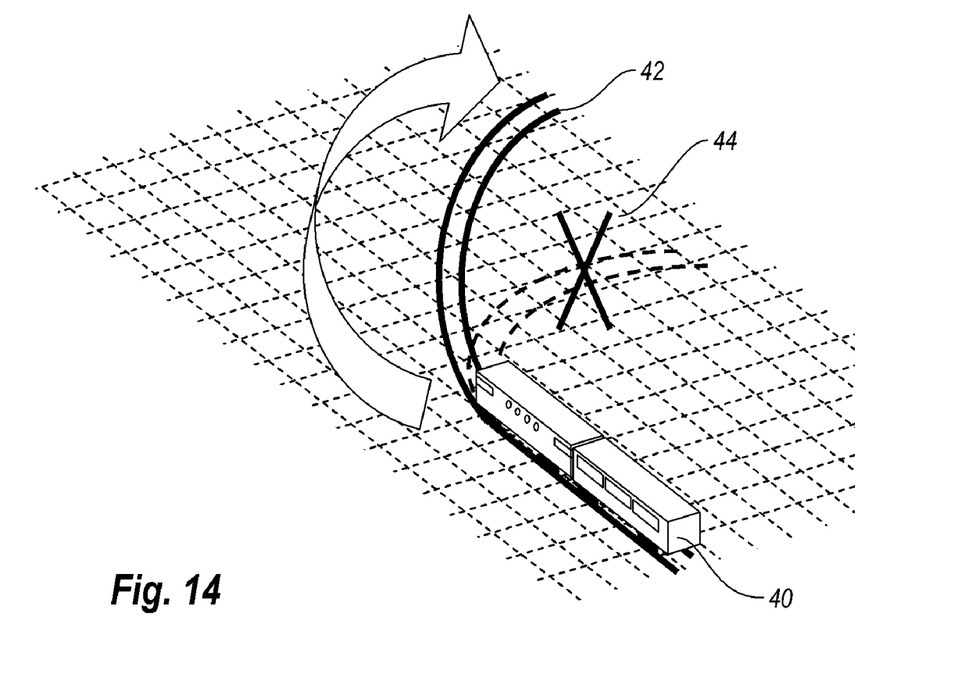
FIG. 14 is a schematic view showing alternative embodiments of the present invention comprising sensor restrictions for railroad applications.

FIG. 14 shows a schematic view of a first example with sensor restrictions for railroad applications. In this example, a train 40 as one embodiment of a track-bound system, follows a trajectory defined by the tracks 42. Another example is a system for control or verification of the precise position of railroad tracks. As curvature of tracks 42 and maximum speed of the train 40 are limited, the space of solutions as potential values for the physical sensors or the GNSS data is accordingly restricted. GNSS data indicating a position perpendicular to the current direction can be rejected as the track characteristics do not allow a sharp edge in their trajectory. This also applies to angular rates indicating a sharp turn of the train 40 that would lead to an impossible location at the crossed out position 44 shown in FIG. 14. The knowledge of the movement characteristics of a specific vehicle allows the definition of typical acceptable behaviour of the system and to use this limiting information when processing the data.

Figure 15:
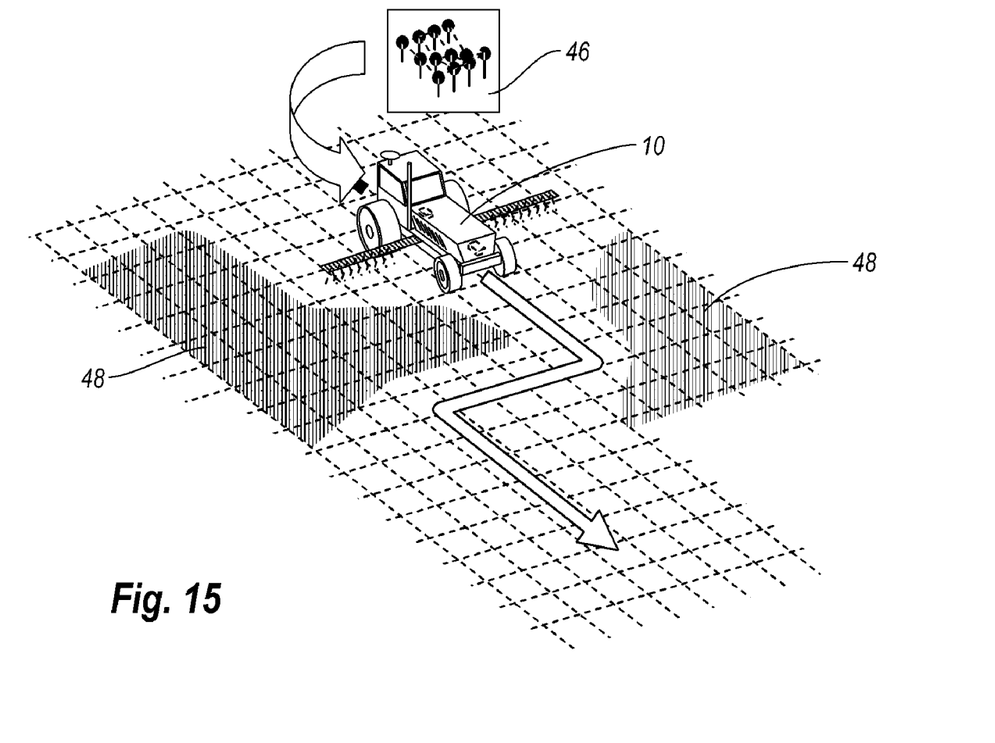
FIG. 15 is a schematic view showing alternative embodiments of the present invention integrating topographic data in the statistical recursive estimator for navigating a vehicle.

FIG. 15 shows a schematic view of another example with integrating topographic data 46 in the recursive statistical estimator 26 for navigating the vehicle 10. Now the processing additionally uses environmental data for the estimator 26, particularly topographic information, e.g. a digital terrain model. The information in this terrain model can be used to directly restrict the potential solutions or statistically to calculate an improved Gain. In this example the terrain model shows two zones 48, e.g. swamps, which are not passable by the vehicle 10. Any calculated positional solution that lies within this area can be refused. Another example is the use of slope data in the estimator 26 together with angular rates received from the angular rate sensor or an inclination sensor.

Hence, embodiments of the present invention provide improved methods and systems for determining a position of a vehicle 10 by supplementing the GNSS data with physical data indicative of at least one physical parameter of at least a part of the vehicle measured by one or more physical sensors 15. The estimated position and velocity of the vehicle 10 generated by the recursive statistical estimator 26 is combined with the physical data and the recursive statistical estimator 26 is seeded with the combined data to determine an updated estimated position of the vehicle 10. A more robust positioning system and method is produced that provides improved positioning solutions particularly when visibility of the satellites 12 in the GNSS is reduced. Embodiments of the present invention include seeding the recursive statistical estimator 26 with vehicle specific characteristics and limitations and/or topographical or environmental data 46, such as a digital terrain model to generate improved positioning solutions.

It should be understood that the drawings are diagrammatic and schematic representations of such example embodiments and, accordingly, are not limiting of the scope of the present invention, nor are the drawings necessarily drawn to scale. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. Detailed descriptions of apparatus and processing techniques known in the field of the invention to one of ordinary skill in the art have been excluded.

We claim:

1. A method for determining a position of a mining, agricultural or rail vehicle including:
    at least one GNSS sensor receiving GNSS signals of a global positioning system;
    at least one physical sensor generating physical data indicative of at least one measured physical parameter of at least a part of the mining, agricultural or rail vehicle;
    seeding a recursive statistical estimator with an output of the at least one GNSS sensor to determine an estimated position and velocity of the mining, agricultural or rail vehicle;
    seeding the recursive statistical estimator with information based on a mining, agricultural or rail vehicle-specific movement limitation characteristic by defining a restriction for values of the at least one physical sensor;
    combining the estimated position and velocity of the mining, agricultural or rail vehicle determined from the output of the at least one GNSS sensor with the physical data generated by the at least one physical sensor and with the mining, agricultural or rail vehicle-specific movement limitation characteristic to generate combined data; and
    seeding the recursive statistical estimator with the combined data to determine an updated estimated position of the mining, agricultural or rail vehicle.

2. A method according to claim 1, wherein the physical parameter is one of the following: position, latitude, longitude, altitude, attitude, heading, inclination, speed, acceleration, rate of angular rotation, magnetic field strength.

3. A method according to claim 1, wherein the recursive statistical estimator comprises one of the following: a Kalman Filter, an extended filter, a complementary filter, an adaptive filter.

4. A method according to claim 1, further including the recursive statistical estimator using a dynamic model describing time-dependent effects on the at least one physical sensor for eliminating bias of the at least one physical sensor.

5. A method according to claim 4, wherein eliminating bias is based on a time series of data generated during movement of the mining, agricultural or rail vehicle.

6. A method according to claim 4, wherein the at least one physical sensor comprises a magnetometer and eliminating bias is based on a calculation of differences between GNSS-signal headings and physical data headings.

7. A method according to claim 4, wherein the at least one physical sensor comprises an angular rate sensor and eliminating bias is based on a best fit of a sequence of GNSS-data with a measured sequence of angular rates.

8. A method according to claim 1, further including seeding the recursive statistical estimator with three-dimensional environmental data.

9. A system for determining a position of a vehicle comprising:
    at least one GNSS sensor mounted to the mining, agricultural or rail vehicle for receiving GNSS signals of a global positioning system;
    at least one physical sensor mounted to the vehicle for generating physical data indicative of a physical parameter of at least a part of the mining, agricultural or rail vehicle;
    three dimensional topographical environmental data describing the topography of the mining, agricultural or rail environment for seeding the recursive statistical estimator;
    a recursive statistical estimator coupled to be in communication with the at least one GNSS sensor for seeding the recursive statistical estimator with an output of the at least one GNSS to determine an estimated position and velocity of the mining, agricultural or rail vehicle; and a data fusion module for combining the estimated position and velocity of the vehicle derived from the GNSS signals of the global positioning system with the physical data derived from the physical data generated by the physical sensor and with the three dimensional topographical data describing the topography of the mining, agricultural or rail environment to generate combined data, wherein the recursive statistical estimator is seeded with the combined data to determine an updated estimated position of the mining, agricultural or rail vehicle.

10. A system according to claim 9, wherein the physical parameter is one of the following: position, latitude, longitude, altitude, attitude, heading, inclination, speed, acceleration, rate of angular rotation, magnetic field strength.

11. A system according to claim 9, wherein the recursive statistical estimator comprises one of the following: a Kalman Filter, an extended filter, a complementary filter, an adaptive filter.

12. A system according to claim 9, further comprising a dynamic model describing time-dependent effects on the at least one physical sensor for eliminating bias of the at least one physical sensor.

13. A system according to claim 12, wherein eliminating bias is based on a time series of data generated during movement of the vehicle mining, agricultural or rail.

14. A system according to claim 12, wherein the at least one physical sensor comprises a magnetometer and eliminating bias is based on a calculation of differences between GNSS-signal headings and physical data headings.

15. A system according to claim 12, wherein the at least one physical sensor comprises an angular rate sensor and eliminating bias is based on a best fit of a sequence of GNSS-data with a measured sequence of angular rates.

16. A system according to claim 10, further comprising information on mining, agricultural or rail vehicle-specific movement characteristics based on restricted values of the at least one physical sensor for seeding the recursive statistical estimator.

17. A processor for determining a position of a mining, agricultural or rail vehicle including:
computer readable program code components configured to cause reception of GNSS signals of a global positioning system;
computer readable program code components configured to cause generation of physical data indicative of at least one measured physical parameter of at least a part of the mining, agricultural or rail vehicle;
computer readable program code components configured to cause seeding a recursive statistical estimator with an output of at least one GNSS sensor to determine an estimated position and velocity of the mining, agricultural or rail vehicle;
computer readable program code components configured to cause combining the estimated position and velocity of the vehicle determined by the recursive statistical estimator based the output of at least one GNSS sensor with the physical data and a dynamic model that is based on an understanding of particular vehicle constraints of the mining, agricultural or rail vehicle as well as the mining agricultural or rail land surface the mining, agricultural or rail vehicle travels on to generate combined data; and
computer readable program code components configured to cause seeding the recursive statistical estimator with the combined data to determine an updated estimated position of the mining, agricultural or rail vehicle.

18. A method according to claim 1, wherein the vehicle-specific movement limitation characteristic is associated with a limitation to the velocity of the vehicle.

19. A method according to claim 1, wherein the vehicle-specific movement limitation characteristic is associated with a track upon which the vehicle travels.

20. A method according to claim 1, wherein the vehicle-specific movement limitation characteristic limits a sharp edge in a trajectory of the vehicle.

21. A method according to claim 1, wherein the vehicle-specific movement limitation characteristic is associated with a known impossible movement of the vehicle.

22. A system according to claim 9, wherein the three-dimensional environmental information includes the slope of terrain upon which the mining, agricultural or rail vehicle travels upon.

23. A system according to claim 9, wherein the mining, agricultural or rail vehicle is an agricultural vehicle and the three-dimensional environmental information includes the location of a rock to be avoided.

* * * * *